Patented May 19, 1931

1,806,564

UNITED STATES PATENT OFFICE

ALPHONS PRILL, OF WIESDORF, AND ROBERT WALTER, OF DESSAU, ANHALT, GERMANY, ASSIGNORS TO AGFA ANSCO CORPORATION, OF BINGHAMTON, NEW YORK, A CORPORATION OF NEW YORK

PROCESS OF PRODUCING 4-SUBSTITUTION PRODUCTS OF THE QUINOLINE SERIES

No Drawing. Application filed March 29, 1929, Serial No. 351,110, and in Germany March 22, 1928.

The present invention relates to the production of 4-substitution products of the quinoline series, more particularly to the process of condensing a primary arylamine with a compound of the general formula

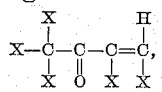

X meaning hydrogen or a univalent substituent, and to a particularly simple manner of separating the reaction product.

We have found, that 4-substitution products of the quinoline series are obtainable in a considerably better yield than by all known methods, by starting from compounds of the general formula $CX_3.CO.CH=CHX$, X meaning hydrogen or a univalent substituent. These are condensed with primary aromatic amines in the presence of an agent which eliminates water and of an oxidizing agent. The condensation probably occurs according to the following formula:

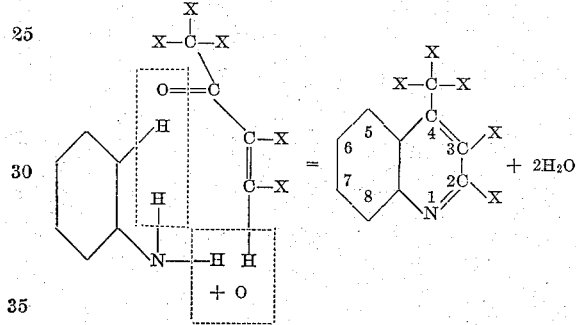

As an agent which eliminates water, for instance sulfuric acid, for instance phosphoric acid, phosphorpentoxide, may be used, and as oxidizing agent nitrobenzene, arsenic acid or others.

The quinolines obtained according to this process may be separated directly from the reaction mixture after dilution with water or the reaction mixture may be distilled with steam after separation of the excess of the oxidizing agent and after the reaction mixture has been made alkaline.

We have further found, that the product of the reaction may be separated in a new and particularly simple manner by converting it into the acid salt of hydroferrocyanic acid. The pure quinoline base can be freed from this salt, which is composed of 2 molecules of base and 1 molecule of hydroferrocyanic acid, by addition of caustic soda lye.

The invention is illustrated by the following example:

*4-methylquinoline from aniline and 3-ketobutene-1*

28 grams of 3-ketobutene-1 are mixed with 35 grams of aniline and 25 grams of nitrobenzene and there is run into the mixture gradually, while shaking, 50 cc. of concentrated sulfuric acid. The mixture, which is strongly heated by the heat of reaction evolved when the sulfuric acid has been added, is allowed to cool, then diluted with water and boiled to expel the excess of nitrobenzene. The mixture is now made alkaline and distilled with steam. The distillate is mixed with an excess of hydrochloric acid and a solution of potassium ferrocyanide is added until the ferrocyanide of the base is precipitated. In this manner there are obtained 12,5 grams of 4-methylquinoline amounting to 24 per cent. of the theoretical yield.

Instead of 3-ketobutene-1 mentioned in the foregoing example, we may use a corresponding quantity of a homologue of this compound corresponding, for instance, to the general formula

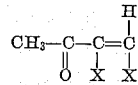

in which at least one X represents an alkyl group.

We claim:

1. Process of producing 4-substitution products of the quinoline series which comprises condensing a primary arylamine with a compound of the general formula:

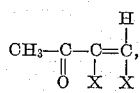

X meaning hydrogen or an alkali group, in the presence of an agent which eliminates water and of an oxidizing agent and isolating the reaction product in the form of its acid salt of hydroferrocyanic acid.

2. Process of producing 4-methyl-derivatives of the quinoline series which comprises condensing a primary amine of the benzene series with a compound of the general formula:

X meaning hydrogen or an alkyl group in the presence of an agent which eliminates water and of an oxidizing agent.

3. Process of producing 4-methylquinoline which comprises condensing aniline with 3-ketobutene-1 ($CH_3.CO.CH=CH_2$) in the presence of an agent which eliminates water and of an oxidizing agent.

4. Process of producing 4-methyl-derivatives of the quinoline series which comprises condensing a primary amine of the benzene series with a compound of the general formula:

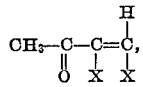

X meaning hydrogen or an alkyl group, in the presence of concentrated sulfuric acid and of nitrobenzene.

5. Process of producing 4-methylquinoline which comprises condensing aniline with 3-ketobutene-1 ($CH_3.CO.CH=CH_2$) in the presence of concentrated sulfuric acid and of nitrobenzene.

In testimony whereof, we affix our signatures.

ALPHONS PRILL.
ROBERT WALTER.